United States Patent
Sean et al.

(10) Patent No.: US 6,767,490 B2
(45) Date of Patent: Jul. 27, 2004

(54) LOW DENSITY ORIENTED STRAND BOARDS

(75) Inventors: Sy Trek Sean, Quebec (CA); Gilles Brunette, Ste-Foy (CA)

(73) Assignee: Nexfor Inc., Toronto (CA)

( * ) Notice: Subject to any disclaimer, the term of this patent is extended or adjusted under 35 U.S.C. 154(b) by 0 days.

(21) Appl. No.: 10/265,453

(22) Filed: Oct. 7, 2002

(65) Prior Publication Data

US 2004/0067334 A1 Apr. 8, 2004

(51) Int. Cl.$^7$ .................................................. B27N 3/00
(52) U.S. Cl. ...................... 264/109; 156/62.2; 156/276; 264/319
(58) Field of Search .............................. 428/106, 101, 428/109, 113, 537.1, 535, 541; 156/276, 62.8, 62.2; 264/109, 297, 319

(56) References Cited

U.S. PATENT DOCUMENTS

| | | |
|---|---|---|
| 2,686,143 A | 8/1954 | Fahrnni |
| 3,061,878 A | 11/1962 | Chapman |
| 3,164,511 A | 1/1965 | Elmendorf |
| 5,047,280 A * | 9/1991 | Bach ........................... 428/182 |
| 2002/0068161 A1 * | 6/2002 | Matuana et al. .......... 428/292.4 |
| 2003/0113530 A1 * | 6/2003 | Go et al. ..................... 428/326 |

* cited by examiner

*Primary Examiner*—Donald J. Loney
(74) *Attorney, Agent, or Firm*—C. A. Rowley

(57) ABSTRACT

A method of producing a strand board having an average density of between 450 and 550 Km/m$^3$ by providing a first set of strands having a moisture content of between 25 and 45% based on the dry weight of said strands and a second set of strand having a moisture content of between 5 and 7% based on the dry weight of said strands and forming a lay-up having a core layer formed of strands from the second set of strands sandwiched between a pair of surfaces layers each formed from strands of the first set. The lay-up is then pressed between heated platens into a consolidated panel having an average density of between 450 and 550 Km/m$^3$ by closing the platens to the thickness of said consolidated panel in less than 30 seconds and raising temperature the said core layer to 100° C. in less than 35 seconds without increasing the core gas pressure above 0.17 MPa.

18 Claims, 3 Drawing Sheets

LOW DENSITY ORIENTED STRAND BOARDS

FIELD OF THE INVENTION

The present invention relates to low-density wood strand board panel and a method of manufacturing such panels.

BACKGROUND TO THE INVENTION

Strand boards more particularly oriented strand board (OSB) are and have been used in construction for more than 20 years. In such construction, such boards or panels are particularly suitable for sheathing and are commonly provided in 4 ft×8 ft. These sheets provide significant competition to plywood panels, which offer a high degree of strength. At low density, the density of plywood panels is in the range of 28 to 32 lbs/ft$^3$ or about 450 to 510 kg/m$^3$.

Oriented strand, boards were initially developed as an alternative to plywood panels. These alternative boards are composed of wood fragments (strands) that are produced from low grade round wood. As is well known an oriented strand board (OSB) panel is formed by layering flakes or strands of wood mixed and coated with a resin or binder (the "furnish") and wax, to form a three layers mat (generally referred to as a lay-up) and pressing the mat under heat and pressure to form a consolidated board. The strands moisture content is controlled to provide the desired moisture content so as to create conditions in the press that avoid such phenomenon as blow back (explosions in the board as the consolidating pressure is released). To produce a consolidated panel having similar strength characteristics with plywood (generally slightly lower) requires the use of more material and produces a higher density product but at a lower materials cost.

Examples of OSB products are provided in the following US Patents: U.S. Pat. No. 4,246,310 (Hunt et al.); U.S. Pat. No. 4,610,913 (Barnes); U.S. Pat. No. 5,506,026 (Iwata et al.); U.S. Pat. No. 5,736,218 (Iwata et al.); and U.S. Pat. No. 6,129,871 (Suzuki et al.).

The typical density of an OSB panel is in the range of 600 to 640 kg/m$^3$, which is considerably higher than that for plywood. In the result, the weight of OSB panels is also considerably greater. It has long been the desire of those in the OSB industry to provide a low density OSB having the required strength requirements. Such an accomplishment will not only reduce the unit cost for a given thickness, but will also make using (handling) of the board significantly easier. For this reason, various attempts have been made to provide a "low density" OSB, that is, a panel that is similar in density to plywood, while still preserving the desired strength characteristics.

A significant component to total production time in the manufacture of OSB and the limiting factor in most plants is the total press time required to consolidate the mat or lay-up to form the consolidated OSB panel. The total press time required to produce a properly consolidated panel is increased with thickness of the panel and, generally about 140 to 180 seconds is required for the 11.1 mm (⁷⁄₁₆) panels. Reducing this time requirement has been a goal of the industry for some time. The prior art, such as U.S. Pat. No. 6,129,871, ('871) provides two methods of providing moisture to an OSB furnish. The first involves the injection of steam into the furnish during the pressing phase. This process requires complex steam injection equipment and specially designed platens in the press to provide the steam into the furnish. As will be understood, this type of process leads to increased production costs. An alternative to the steam injection process is the addition of water to the furnish to increase the moisture content. For example, in the '871 patent, the moisture content of the wooden strands in the furnish is first adjusted to about 10 to 25 wt % prior to pressing. The final panel results in a moisture content of 5 to 15 wt %.

As mentioned above, one of the industry goals is to provide a low density OSB panel that can be made with less wood while maintaining the desired strength characteristics of the final product. Simply reducing the wood content of the furnish (i.e. reducing the density of the furnish) was found to lead to an increase in air voids in the furnish and resulting in lower heat conductivity during pressing. One solution to this problem was to provide more moisture to the furnish. However, this was found to result in further problems. Firstly, a furnish having a higher moisture content was found to require higher press platen temperatures and longer cycle times (i.e. time within the press) since a greater volume of water needed to be converted to steam. Secondly, the increased moisture content and associated increased steam generation resulted in extremely high pressures within the panel. In the result, once the press was opened, the rapid release of pressure caused a "blow-out", or explosive expansion of the boards. Such blowouts result in loss of production time, waste of material, and potentially dangerous conditions for workers.

Fahrni in U.S. Pat. No. 2,686,143 attempted to make a strandboard using different types of strands in the core than in the surface layers and different amounts of binder in the core and surface layers i.e. significantly higher binder content in the surface layers than in the core. It is not clear how successful this attempt may have been to produce a low-density board, but the amount of resin required in the surface layers makes the cost of such a board non-competitive.

Elemdorf a pioneer in the OSB field attempted to improve OSB strength characteristics by using cement as the binder (see U.S. Pat. No. 3,164,511).

Chapman (one of the originators of the waferboard industry) in U.S. Pat. No. 2,061,878 teaches the use of green wood strands (not dried) to produce a superior product as compared with one produced from dried wood strands.

Therefore, there is a need for a process for producing low-density OSB panels that avoids at least some of the problems in the known methods. The present invention seeks to address this need.

SUMMARY OF THE INVENTION

It is an object of this invention to provide a method of producing a low-density OSB panel having acceptable strength characteristics and to the product so produced:

Broadly the present invention relates to a method of producing a strand board having an average density of between 450 and 550 kg/m$^3$ comprising: conditioning a first set of strands to a moisture content of between 20 and 50% based on the dry weight of said strands and coating a bonding resin to the surfaces of said strands to provide a first set of resinated strands, conditioning a second set of strands to a moisture content of between 2 to 15%, based on the dry weight of strands in said second set of strands and coating a bonding resin to the surfaces of said strands of said second set of strands to provide a second set of resinated strands, forming a mat lay-up having a core layer formed of said second set of resinated strands sandwiched between a pair of surfaces layers each formed from said first set of resinated strands, pressing said mat lay-up between heated platens to form a consolidated panel having an average density of between 450 and 550 kg/m³, said pressing including closing said platens to the thickness of said consolidated panel in less than 30 seconds and raising temperature of said core layer to 100° C. in less than 35 seconds without increasing the core gas pressure above 0.17 MPa.

Preferably, said closing said platens to panel thickness in less than 20 seconds.

Preferably, conditioning said first set of strands to a moisture content of between 25 and 40% based on the dry weight of said strands.

Preferably, said conditioning said second set of strands conditions said strands to a moisture content lower than 10% based on the dry weight of said strands.

Preferably, said conditioning said second set of strands conditions said strands to a moisture content of between 4 and 8% based on the dry weight of said strands.

Preferably, said pressing said mat lay-up between heated platens to form a consolidated panel is completed in at least 10% less time than that normally required for pressing based on the thickness of said panel.

Preferably, said pressing said mat lay-up between heated platens to form a consolidated panel is completed in at least 30% less time than that normally required for pressing based on the thickness of said panel.

Broadly the present invention also relates to a resin bonded consolidated panel made of wood strands said panel having an average density of between 450 and 550 kg/m³, a maximum density of at least 700 kg/m³ within 0.6 mm of the surface of said panel, an average MOE of at least 3000 MPa and an average MOR of at least 20 MPa and an internal bond of at least 0.28 MPa.

BRIEF DESCRIPTION OF THE DRAWINGS

Further features, objects and advantages will be evident from the following detailed description of the present invention taken in conjunction with the accompanying drawings in which.

DESCRIPTION OF THE PREFERRED EMBODIMENTS

The term "strand", is used herein as it is currently used in the art and is intended to include flakes, wafers or other suitable wood elements used in forming composite panels particularly oriented strand board (OSB) panels. In the examples given below the strands had a length measured in the grain direction of 8 to 10 centimeters (cm); width measured perpendicular to the length of 1 to 3 cm; and a thickness measured perpendicular to the width and length of 0.05 to 0.07 cm.

In very general terms, the present invention provides a composite wood panel i.e. an OSB panel generally made from a three layer lay-up (two face layers and one core layer). The face layers of the mat lay-up comprise wood strands having a high moisture content about 20 to 50% while the core layer comprises wood strands having a relatively low moisture content of 2 to 15%. When pressing such a layered mat lay-up, with such a significant a face/core moisture content differential, it is found that steam generated in the face layers when using a relatively fast closing time (less than 30 seconds) as will be described below is driven into the core layer thereby providing the required heat for curing the binder or resin. With the method of the present invention, the wood content of the furnish is reduced yet the physical properties of the consolidated board are satisfactory and production can be sustained.

Also important is the fact that the total time in the press (total pressing time) may be significantly reduced when practising the present invention i.e. total pressing times may be reduced by at least 10 and preferably at least 30% based on the normal pressing time for an equivalent thickness consolidated panel, for example, panels having a thickness of about 11.1 mm from about 160 seconds to less than 110 seconds, preferably less than 100 seconds and for panels having a thickness of about 19 mm from 240 seconds to about 150 seconds. Obviously for any given production line the time will be reduced to that commensurate with other limiting factors in the system, but normally the present invention will permit significant reduction in production pressing time.

Figure 1:
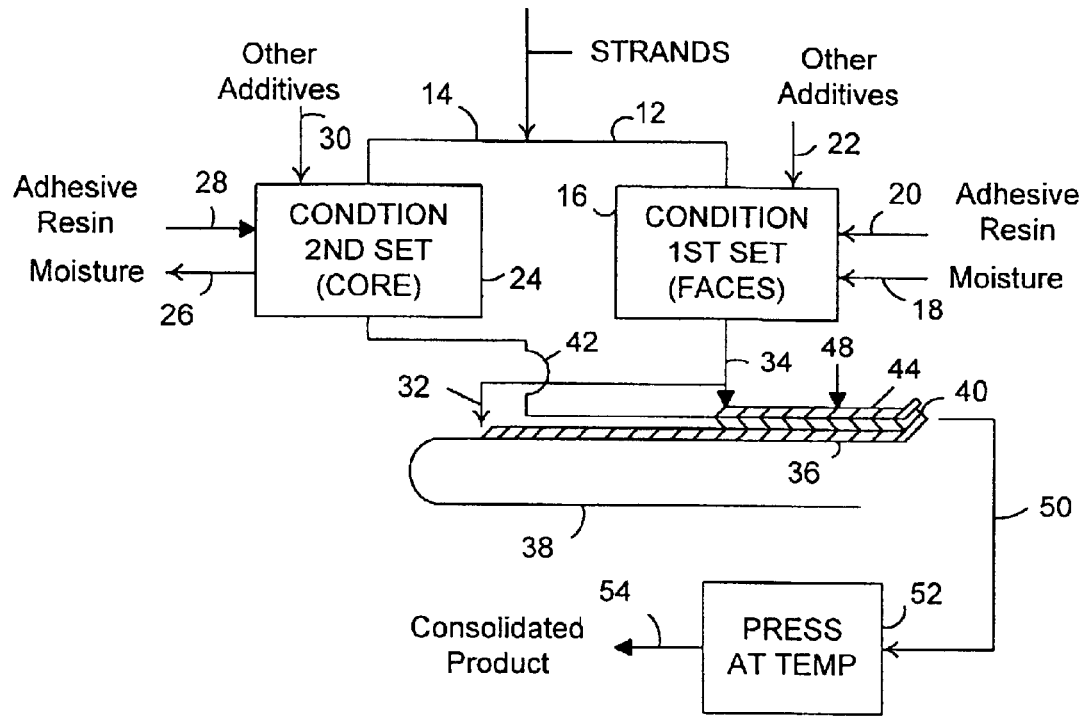
FIG. 1 is a flow diagram illustrating the process of the present invention

As illustrated schematically in FIG. 1 the process of the present invention strands are introduced as indicated by the arrow 10 and are divided into a first and a second set of strands as indicated by the arrows 12 and 14. The first set of strands which are intended to form the face or outside layers of the finished panel are conditioned as indicated at 16 by adding moisture as indicated at 18 adhesives (resins preferably resins that can accommodate high moisture contents such as MDI (polymeric methylene di-isocyanate resins)) as indicated at 20 and other additive as indicated at 22 and the strands conditioned to relatively uniformly distribute the moisture, resin and other additives onto the strands to form a first set of resinated strands. The use of conventional phenol resins has been found to be unsatisfactory with the high moisture content of the present invention.

Generally the moisture content of the first set of resinated strands will be adjusted to about 20 to 50% based on the dry weight of the strands preferably 20 to 30%, a resin pick up of about 2 to 10% preferably less than 7% and other additives such as slack or emulsion wax etc as normally used in the manufacture of OSB. The amount of moisture content in first set of strands is very important as described herein and the amount of resin will normally be tailored to obtain the required strength i.e. internal bond (IB) in the consolidated panel bearing in mind the less resin used the more competitive the product.

As above indicated the type of resin selected must be compatible with the high moisture content in the lay-up, thus MDI (methylene di-isocyanate) type resin will normally be used, however other types of resin may be used if they are compatible with the process.

The second set of strands will be treated in conditioner 24 a different way to those of the first set and may even require a drying step to remove moisture as indicated by the arrow 26 to provide strands with a moisture content of between 2 and 15% preferably less than 10% and most preferably between 4 and 8% based on the dry weight of the strands which is critical to the process. The amounts and types of adhesive and or other additives as added via the lines 28 and 30 respectively will be the same as or at least compatible with those added to the first set of strands in conditioner 16 thereby to provide a second set of resinated strands.

The strands of the first set of resinated strands will be divided into two flows as indicated by the arrows 32 and 34 with the strands in flow 32 (32 schematically indicates a former or laying head for the strands) forming a bottom face layer 36 on the forming surface 38 (surface 38 is shown as a continuous forming belt, but it could be formed by a caul plate on which the strands are laid). A core layer 40 made from strands of the second set of resinated strands as indicated by the arrow 42 (schematically indicating a former 42) 1) leading from the second conditioner 24 and a second face layer (top layer in the illustrated process) 44 is formed by strands from the first set as indicated by arrow 34 (34 like 32 schematically represents former) leading from the first conditioner 16. In the schematic illustration each arrow 32, 34 and 42 represents a single former or strand laying station, however as is well known any one or more of the layer 36, 40 and 44 could be made using multiple formers in series. The formers 32, 34 and 42 normally are each orienting formers that orient the strands in the conventional manner so that their longitudinal axes are substantially parallel In conventional OSB the strands in the face layers are preferably oriented with their length directions (grain direction) parallel and parallel to the longitudinal direction of the panel being produced and the core strands are preferably oriented with their longitudinal axes (grain direction) perpendicular to those of the face layers. It will be noted that these orientations of the face and core wafers while important in some applications may not be essential.

The three layers 36, 40 and 44 combine to form a mat lay-up generally indicated at 48 that is taken as indicated by the arrow 50 to a press station 52 wherein the lay-up 48 is cut into discreet panel sizes and pressed between platens normally in a multi-opening press or is pressed in a continuous press and later cut into panels. The pressing station 52 presses the lay-up at elevated temperature to form a consolidated panel or end product of the process leaving as indicated by the arrow 54.

Preferably the thickness of the layers 36 and 44 will be essentially the same and will each comprise between 20 and 35% of the total thickness of the lay-up 48 preferably about 25% of the thickness with the balance being made up by the core 40. The thickness of the various layers is important in that the layers 36 and 44 carry significantly more water then in conventional OSB lay-ups. This additional moisture (as above described between about 20 and 50% based on the dry weight of the strands) has been found to be advantageous in that it facilitates and improves heat transfer through the full thickness of the panel. At least a significant portion of this additional moisture has to be vented from the panel and this accomplished by the central or core layer, which is significantly less dense thereby facilitating the passage of moisture as steam therethrough. Thus the face and core must be properly sized to permit the process to operate effectively. Generally higher moisture contents in the face layers with lower face/core moisture ratios.

Generally the face to core ratio will be set based on the plant capacity and normally the will be between 15/70/15 and 30/40/30 (face/core/face % of total thickness of the mat lay-up). In most if not all commercial plants the mat lay-up is symmetrical i.e. the face layers have the same thickness. The higher the moisture content of the face layers, the less the required thickness of the face layers for optimum performance. The higher moisture content of the face layer the better the heat transfer from the press to the lay-up, however the thicker the face layer the greater the moisture that has to escape from the panel without causing blowback.

The higher the moisture content of the core must be sufficient to transfer the heat (and depending on the resin to react with the resin, but should be optimized as any extra moisture requires further heat from the press to evaporate and generates more stream that has to escape from the panel without damaging the panel. As described herein the moisture content of the core should not exceed 15% of the dry weight of the strands and generally will be less than 10 and greater than 2%, with the most preferred range being between 4 and 8%.

The pressing process is very important to obtaining the required product and will be described in more detail herein below.

Figure 2:
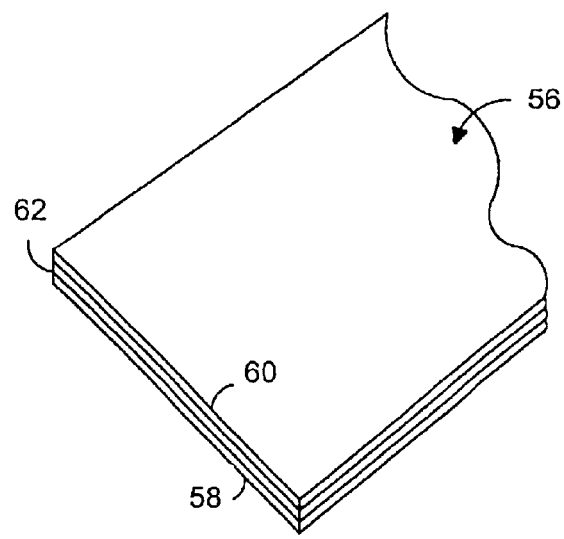
FIG. 2 is a partial isometric view of a panel constructed according to this invention showing the three layers of the preferred form of the invention.

The product as indicated in FIG. 2 is a panel 56 formed of 3 (or more) distinct layers namely a pair of face layers 58 and 60 formed from the layers 36 and 44 of the lay-up 48 and a core layer 62 formed from the layer 40 of the lay-up 48.

Figure 3:
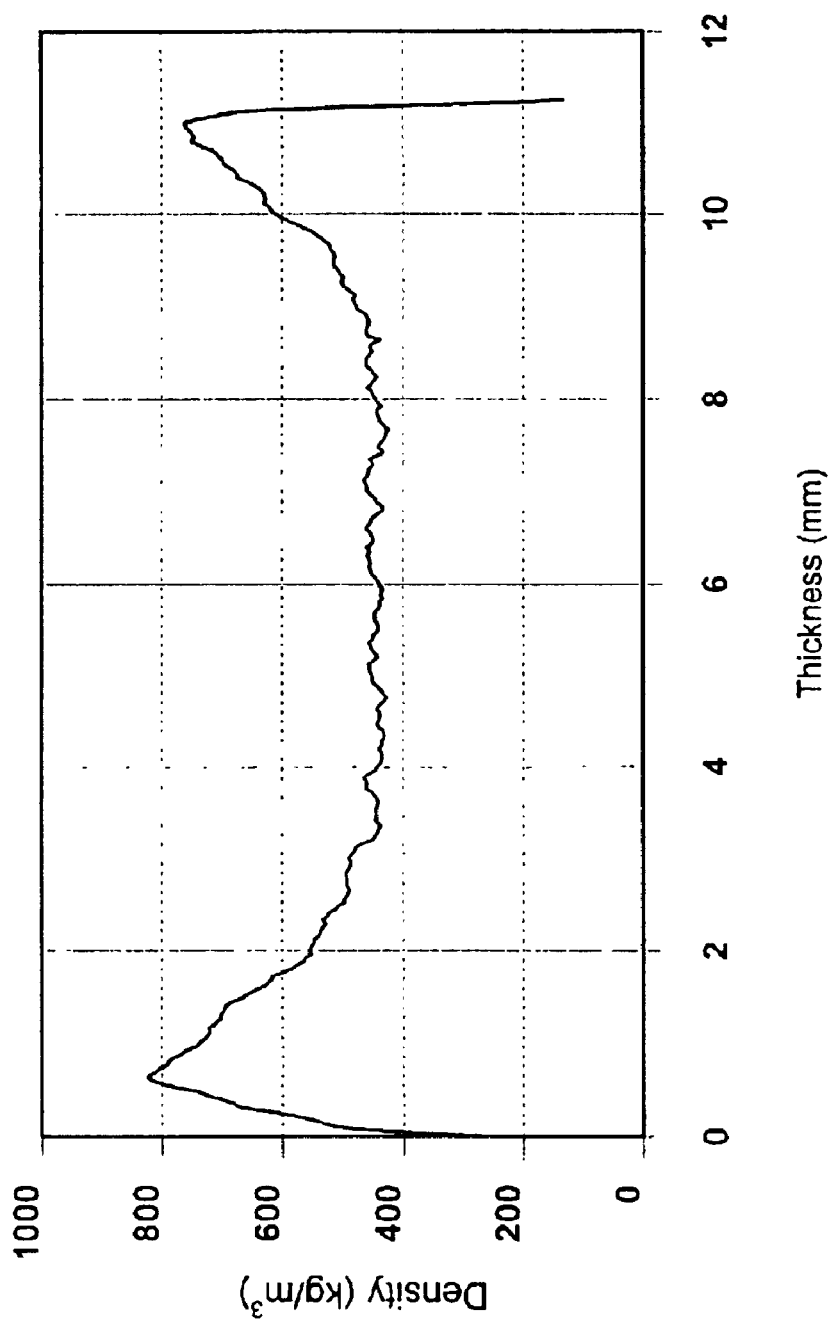
FIG. 3 shows a typical density profile through the thickness of a panel constructed in accordance with this invention.

The product has a specific density profile having an average density of between 450 and 550 $kg/m^3$, a maximum density of at least 700 $kg/m^3$ with the areas of maximum density located close to each of the surfaces i.e. within 0.6 mm of the surface of the panel 58 (see FIG. 3). This configuration provides a panel with an average modulus of elasticity MOE of at least 3000 MPa and an average Modulus of rupture MOR of at least 20 MPa and an internal bond (IB) of at least 0.28 MPa.

As above indicated the conditioning of the first and second sets of strands and the pressing process are all critical to obtaining a panel 58 with these required properties The purpose of the hot pressing is to compress the lay-up (made of loose furnish of strands as above described) and to provide the energy to polymerised the resin, hence to consolidate the compressed panel 58. There are generally 3 important steps in hot pressing cycle: namely closing time, curing time and opening time.

Pressing Cycle:

The "closing time" is defined as time required for the press to close until reaching the target thickness of the panel. Generally 2 factors are strongly affected by the closing time: heat transfer efficiency (capacity to transfer the energy from hot platen to the panel) and vertical density profile (density variation of panel along the thickness direction). A faster closing time generally provides better heat transfer and pronounced variation in vertical density profile to the panel to form a panel with its highest density close to the surfaces of the consolidated panel. If closing time is too slow heat transfer is impaired and the highest density portions of the panel are located farther from the panel surface which can significantly increase the total time required to press the panel and significantly reduce the modulus of elasticity (MOE) of the consolidated panel. There is however some limitation due to the hydraulic press capacity.

The "curing time" is time that allowed the resin to polymerise hence panel consolidation prior to press opening. Curing time is strongly affected by resin reactivity, heat transfer efficiency and platen temperature. Longer curing time generally provides higher overall properties to the panels but low productivity. Shorter curing time however may substantially compromise the panel quality. The time required for the core temperature to reach curing temperature is a significant factor in determining the time required to cure the resin thus the faster the core temperature reaches say 100° C. the more quickly the resin is cured and thus enabling reduction in total press time required and thus increasing the productivity of the process.

Curing time also provides time for the pressure within the consolidating panel to at least partially be vented so that on opening the press (during opening time, see below) there is reduce possibility for what is known as blow back (local explosion of the panel as the pressure is released thereby ruining the panel).

The "opening time" is defined as supplement time required to fully control the position of the press to slowly open the press to allow the internal pressure releasing from panel prior to fully open the press without causing panel delamination or explosion. The opening time is typically a function of panel internal pressure and the capability of the internal pressure to be released from the panel. Of course furnish with high humidity causes panel with high internal pressure, while, panel with high density requires more time for the internal pressure to be released as compare to the low density panel of the present invention.

"Total time" includes all of the above, namely closing, curing and opening time.

The key points that differentiate the present invention are the combination of the three specific parameters: fast closing time less than 30 seconds (s), high furnish moisture content in the surface layers (20 to 50% based on the dry weight of the strands) and significantly lower in the core (2 to 15% based on the dry weight of the strands) and a low average density of the consolidated panel of between 450 and 550 kg/m$^3$

EXAMPLES

Various test panels were formed using the method described above to provide OSB panels with a target average density of 450 to 550 kg/m$^3$ (i.e. about 28 to 34 pounds per cubic foot). Specifically, test panels of dimensions 86 cm×86 cm×11.1 mm thick (34×34×7/16 inches) were formed using a furnish comprising three layers. The furnish was provided with a 50/50 face/core ratio so that the face/core/face layers were provided in a 25/50/25 ratio. MDI resin was applied to the furnish in an mount of 4 wt %. The conditions of the press for each test panel were as follows:

The results are presented in Table 1. Each test result represents the average of testing a plurality of panels. The abbreviations used in the table P means pressure; GP gas pressure; T means temperature; IB means internal bond; and MOE and MOR are as herein above defined.

Clearly as shown by test 3 the use of a high moisture content in the face layers produced a consolidated product of the required physical characteristics. When the moisture content was reduced in the face layers to 8% (prior art-test 1) the internal bond of the product was significantly reduced and when the closing time was increased to 60 seconds (test 6) the resulting product was not acceptable for a variety of reasons. It is also clear that when higher density panels were made (tests 2 and 5) neither the closing times 15 and 60 seconds respectively nor the moisture contents of the face layers were critical to achieving the required MOE and MOR in the product.

It must be noted that the total press time used for these test 150 seconds is about the same as would be used in the industry when the advantage of the invention are not being fully utilized i.e. the shorted press times are not being used, however with this extend press time and longer closing times of 60 seconds the results obtained are shown in test 4, 5 and 6.

When high-density panels were attempted to be made with high face moisture it was not possible to obtain a bond (see tests 7 and 8).

Test 3 clearly illustrates that when the present invention was applied and a low-density panel was made from a lay-up having a high moisture contented in the face layers (40%) and a short closing time (15 seconds) a far superior low-density panel was produced.

Figure 4:
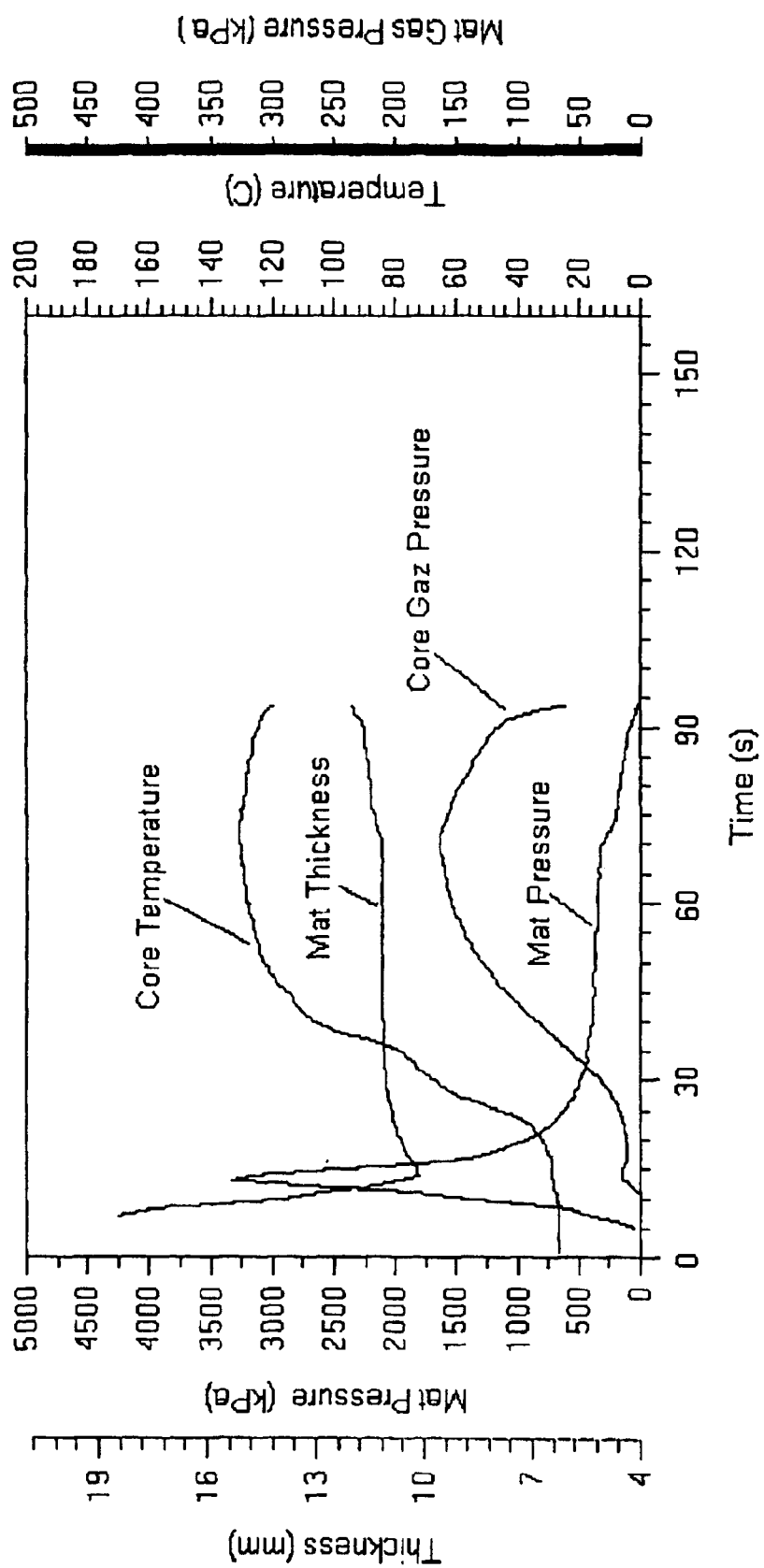
FIG. 4 shows plots of time from the commencement of pressing through to the end of the press cycle versus Core temperature, Mat pressure and Gas pressure at the core illustrating a typical example of how the board or panel is processed when the present invention is applied.

FIG. 4 illustrates what typically occurs when practising the present invention and shows specifically the curves generated when producing one of the panels summarised in test 3 in Table 1. Clearly by quickly closing the press the mat pressure peaks very early and the core temperature reaches 100° C. very quickly so that the resin begins to cure early and continues to cure so that curing is completed in a short period of time and the total press time may be significantly reduced thereby permitting increased production from a given press.

Table 2 presents the results obtained by varying the total press time and employing a total press time significantly shorter than that conventionally used.

The results presented in Table 2 were obtained using:
1. Platen temperature, 230° C.
2. Strands made in the laboratory from Aspen,
3. The strands used were 0.50–0.70 mm thick; 5–25 mm wide; and 127 mm long.
4. The panels produced were 86 cm wide and 86 cm long and all had a final panel thickness of 11.1 mm except for panel no. 29 and 30, which have a thickness of 18.2 mm.
5. Layer thickness ratio used was 15/70/15 face/core/face.

A review of Table 2 indicates that in the laboratory tests satisfactory results may be obtained with the present invention using very fast total press times (95 seconds) and high face moisture contents see for example Panels no 17–20. When the core moisture was significantly increased the I.B. of the resulting panel was very low (unacceptably low) see Panel no. 21. When the resin content was raised and the moisture in the face reduced to 35% the I.B of the panel was improved (see Panels no. 22–26). Increasing the resin content even higher further increased the I.B of the panel (see Panels no. 27 and 28).

Panels 29 and 30 show that with the high moisture content in the face layer as taught herein a satisfactory panel is also produced using longer press times (Panel no 29 with a press time of 160 seconds), however using the same thickness and resin content with a conventional moisture content in the core and face layers and a total press time of 160 seconds no satisfactory bond was achieved.

The tests have been done in a laboratory generally producing panel having dimensions significantly smaller than those of commercially produced panels, thus it is expected that minor modifications to the times and moisture contents and ratio of layer thickness (surface to core layer thickness may be required when the invention is practised on a commercial scale. Table 3 clearly shows that with high face moisture content and a short closing time as taught by this invention the resulting board when produced in a shorter pressing time (105 seconds) had better physical characteristics that when the longer (conventional) time (150 seconds) was used see test no. 30 (fast closing time) and 70 (slow closing time) while the reverse is true with the low moisture content face layers see test 10 (fast closing time) and 50 and 60 (slow closing time). When the high-density board was to be produced (test 60) no bond was obtained at the shorter total time, whereas when the longer time was used 150 seconds a satisfactory product was produced.

Although the invention has been described with reference to certain specific embodiments, various modifications thereof will be apparent to those skilled in the art without departing from the spirit and scope of the invention as outlined in the claims appended hereto.

TABLE 1

| Test No. | Face Moisture % | Closing time sec | Average Panel Density Kg/m³ | Mat P Max MPa @ sec. | Core GP Max MPa @ sec | Time to Core T 100° C. sec | Max. Density Kg/m³ @ mm* | Min Density Kg/m³ @ mm* | Average I.B MPa | Average MOE MPa | Average MOR MPa |
|---|---|---|---|---|---|---|---|---|---|---|---|
| 1. | 8 | 15 | 458 | 4.17 @ 15 | 0.02 @ 75 | 54 | 650 @ 0.75 | 420 @ 6 | 0.20 | 2988 | 24.0 |
| 2 | 8 | 15 | 617 650 | 6.68 @ 15 | 0.21 @ 130 | 65 | 970 @ 0.75 | 550 @ 5.5 | 0.55 | 4925 | 41.5 |
| 3 | 40 | 15 | 460 510 | 3.20 @ 15 | 0.13 @ 60 | 25 | 700 @ 0.5 | 400 @ 5 | 0.28 | 3000 | 21.6 |
| 4 | 8 | 60 | 471 500 | 2.08 @ 55 | 0.06 @ 135 | 90 | 550 @ 1.5 | 400 @ 5 | 0.28 | 3040 | 24.4 |
| 5 | 8 | 60 | 610 640 | 4.52 @ 55 | 0.18 @ 135 | 90 | 750 @ 2 | 520 @ 5.5 | 0.51 | 4290 | 36.5 |
| 6 | 40 | 60 | 461 515 | 1.04 @ 59 | 0.15 @ 120 | 50 | 560 @ 0.8 | 450 @ 5 | 0.31 | 1680 | 18.9 |
| 7 | 40 | 60 | 640 | 3.45 @ 59 | 0.56 @ 150 | 46 | Unable to made panel (exploded) | | | | |
| 8 | 40 | 15 | 640 | 6.68 @ 15 | 0.60 @ 150 | 51 | Unable to made panel (exploded) | | | | |

Panel size: 11.1 mm thick × 90 × 90 cm - non-oriented
Furnish: Commercial Aspen strands
Core Furnish Moisture Content (CFMC): 7%
Resin content: 4% Commercial MDI, BASF # Lupranate M20SB ((polymeric methylene di-isocyanate resin)
Wax: 1.5% commercial slack wax, Esso #778
Total Pressing time: 150 seconds (sec.) including 25 sec. opening time
Pressing platen temperature: 200° C.
*Measured from the top face in the press

TABLE 2

| Panel No. | Core Moisture % | Face Moisture % | Closing time Sec | Opening time Sec | Total Time Sec | Time to Core T = 100° C. | MOR MPa | MOE MPa | LB MPa |
|---|---|---|---|---|---|---|---|---|---|
| 15* | 15 | 20 | 21 | 20 | 115 | 44 | 31.05 | 3588 | 0.400 |
| 16* | 15 | 20 | 20 | 20 | 110 | 42 | 29.67 | 3588 | 0.407 |
| 17* | 15 | 50 | 20 | 15 | 95 | 38 | 26.22 | 2967 | 0.289 |
| 18* | 15 | 50 | 20 | 20 | 95 | 32 | 31.05 | 3726 | 0.303 |
| 19* | 5 | 35 | 20 | 20 | 95 | 20 | 34.50 | 3864 | 0.469 |
| 20* | 5 | 35 | 20 | 20 | 95 | 33 | 35.88 | 4071 | 0.503 |
| 21* | 25 | 35 | 20 | 20 | 95 | 42 | 25.53 | 3036 | 0.213 |
| 22** | 15 | 35 | 24 | 20 | 95 | 36 | 35.19 | 4140 | 0.634 |
| 23** | 15 | 35 | 28 | 20 | 95 | 26 | 36.57 | 4071 | 0.572 |
| 24** | 15 | 35 | 28 | 20 | 95 | 36 | 35.88 | 4071 | 0.607 |
| 25** | 5 | 20 | 28 | 20 | 95 | 37 | 33.12 | 4002 | 0.331 |
| 26** | 5 | 50 | 28 | 20 | 95 | 30 | 28.99 | 3657 | 0.524 |
| 27*** | 15 | 50 | 28 | 20 | 95 | 23 | 37.26 | 4071 | 0.800 |
| 28*** | 5 | 35 | 28 | 20 | 95 | 33 | 34.45 | 3450 | 0.483 |
| 29**** | 10 | 35 | 30 | 20 | 160 | 63 | 31.05 | 4002 | 0.414 |
| 30**** | 2.6 | 6.5 | 40 | 40 | 108 | 115 | No Bond | | |

*5% MDI type resin Huntsman Polyurethanes # Rubinate^R 1840 used in core and surface layers
**7.5% MDI type resin Huntsman Polyurethanes # Rubinate^R 1840 used in core and surface layers
***10% MDI type resin Huntsman Polyurethanes # Rubinate^R 1840 used in core and surface layers
****23/32 thick panel bonded with 10% MDI type resin Huntsman Polyurethanes # Rubinate^R 1840 used in core and surface layers
Panel size: 11.1 mm thick × 86 cm × 86 cm (7/16 thick × 34 × 34 inches) - non-oriented
Furnish: Aspen laboratory made strands
Ratio Face layers to Core Layer: 15/70/15
Wax: 1.5% commercial slack wax, Esso #778
Pressing platen temperature: 230° C.

TABLE 3

| | | | 105 seconds of total pressing time | | | | 150 seconds of total pressing time | | | |
|---|---|---|---|---|---|---|---|---|---|---|
| Test No. | Face Moisture % | Closing T Sec | O.D Density (Kg/m³) | Average I.B MPa | Average MOE MPa | Average MOR MPa | OD Density (Kg/m³) | Average I.B MPa | Average MOE MPa | Average MOR MPa |
| 10 | 8 | 15 | 496 | 0.17 | 2768 | 18.71 | 450 | 0.20 | 2988 | 24.0 |
| 30 | 40 | 15 | 496 | 0.50 | 3071 | 23.56 | 460 | 0.28 | 3000 | 21.6 |
| 50 | 8 | 60 | 480* | 0.08 | 2220 | 8.62 | 471 | 0.28 | 3040 | 24.4 |

TABLE 3-continued

| 60 | 8  | 60 | 640* |      | No bond |       | 610 | 0.51 | 4290 | 36.5 |
| 70 | 40 | 60 | 488  | 0.41 | 2220    | 16.81 | 469 | 0.31 | 1680 | 18.9 |

| | |
|---|---|
| Panel size | 11.1 mm thick × 86 cm × 86 cm (7/16 thick × 34 × 34 inches) - non-oriented |
| Furnish | Commercial Aspen strands |
| Core Furnish Moisture Content | 7% |
| Resin Content | 4% Commercial MDI, BASF # Lupranate M20SB ((polymeric methylene di-isocyanate resin) |
| Wax | 1.5% commercial slack wax, Esso #778 |
| Total Pressing Time | 150 and 105 seconds (sec) including 25 sec opening time |
| Pressing Platen Temperature | 200° C. |

What is claimed is:

1. A method of producing a strand board having an average density of between 450 and 550 kg/m³ comprising: conditioning a first set of strands to a moisture content of between 20 and 50% based on the dry weight of said strands and coating a bonding resin to the surfaces of said strands to provide a first set of resinated strands, conditioning a second set of strands to a moisture content of between 2 to 15%, based on the dry weight of strands in said second set of strands and coating a bonding resin to the surfaces of said strands of said second set of strands to provide a second set of resinated strands, forming a mat lay-up having a core layer formed of said second set of resinated strands sandwiched between a pair of surfaces layers each formed from said first set of resinated strands, pressing said mat lay-up between heated platens to form a consolidated panel having an average density of between 450 and 550 kg/m³, said pressing including closing said platens to the thickness of said consolidated panel in less than 30 seconds and raising temperature of said core layer to 100° C. in less than 35 seconds without increasing the core gas pressure above 0.17 MPa.

2. A method as defined in claim 1 wherein said closing said platens is completed in less than 20 seconds.

3. A method as defined in claim 1 wherein said condition said first set of strands conditions said first set of strands to a uniform moisture content of between 25 and 40% based on the dry weight of said strands.

4. A method as defined in claim 2 wherein said conditioning said first set of strands conditions said first set of strands to a moisture content of between 25 and 40% based on the dry weight of said strands.

5. A method as defined in claim 1 wherein said condition said second set of strands conditions said second set of strands to moisture content of less than 10% based on the dry weight of said strands.

6. A method as defined in claim 2 wherein, said conditioning said second set of strands conditions said second set of strands to a moisture content lower than 10% on the dry weight of said strands.

7. A method as defined in claim 1 wherein, said conditioning said second set of strands conditions said second set of strands to a moisture content of between 4 and 8% based on the dry weight of said strands.

8. A method as defined in claim 2 wherein, said conditioning said second set of strands conditions said second set of strands to a moisture content of between 4 and 8% based on the dry weight of said strands.

9. A method as defined in claim 1 wherein, said pressing said mat lay-up between heated platens to form a consolidated panel is completed in at least 10% less time than mat normally required for pressing based on the thickness of said panel.

10. A method as defined in claim 2 wherein, said pressing said mat lay-up between heated platens to form a consolidated panel is completed in at least 10% less time than that normally required for pressing based on the thickness of said panel.

11. A method as defined in claim 3 wherein, said pressing said mat lay-up between heated platens to form a consolidated panel is completed in at least 10% less time than that normally required for pressing based on the thickness of said panel.

12. A method as defined in claim 5 wherein, said pressing said mat lay-up between heated pistons to form a consolidated panel is completed in at least 10% less time than that normally required for pressing based on the thickness of said panel.

13. A method as defined in claim 7 wherein, said pressing said mat lay-up between heated platens to form a consolidated panel is completed in at least 10% less time than that normally required for pressing based on the thickness of said panel.

14. A method as defined in claim 9 wherein, said pressing said mat lay-up between heated platens to form a consolidated panel is completed in at least 30% less time than that normally required for pressing based on the thickness of said panel.

15. A method as defined in claim 10 wherein, said pressing said mat lay-up between heated platens to form a consolidated panel is completed in at least 30% less time than that normally required for pressing based on the thickness of said panel.

16. A method as defined in claim 11 wherein, said pressing said mat lay-up between heated platens to form a consolidated panel is completed in at least 30% less time than that normally required for pressing based on the thickness of said panel.

17. A method as defined in claim 12 wherein, said pressing said mat lay-up between heated platens to form a consolidated panel is completed in at least 30% less time than that normally required for pressing based on the thickness of said panel.

18. A method as defined in claim 13 wherein, said pressing said mat lay-up between heated platens to form a consolidated panel is completed in at least 30% less time than that normally required for pressing based on the thickness of said panel.

* * * * *